United States Patent
Kuntz et al.

(10) Patent No.: US 7,878,810 B2
(45) Date of Patent: Feb. 1, 2011

(54) COGNITIVE / NON-COGNITIVE ABILITY ANALYSIS ENGINE

(75) Inventors: David L. Kuntz, Yardley, PA (US); Jody S. Underwood, Croydon, NH (US); Diana Cano, London (GB)

(73) Assignee: Educational Testing Service, Princeton, NJ (US)

( * ) Notice: Subject to any disclaimer, the term of this patent is extended or adjusted under 35 U.S.C. 154(b) by 230 days.

(21) Appl. No.: 11/972,411

(22) Filed: Jan. 10, 2008

(65) Prior Publication Data

US 2008/0176203 A1    Jul. 24, 2008

Related U.S. Application Data

(60) Provisional application No. 60/884,284, filed on Jan. 10, 2007.

(51) Int. Cl.
   *G09B 19/00*   (2006.01)
(52) U.S. Cl. .................................................... 434/236
(58) Field of Classification Search .................. 434/236
   See application file for complete search history.

(56) References Cited

U.S. PATENT DOCUMENTS

| | | | |
|---|---|---|---|
| 6,711,541 B1 | 3/2004 | Kuhn et al. | |
| 6,712,615 B2 * | 3/2004 | Martin | 434/236 |
| 6,832,069 B2 * | 12/2004 | Stout et al. | 434/353 |
| 7,346,541 B1 * | 3/2008 | Cuttler et al. | 705/11 |
| 2004/0180317 A1 * | 9/2004 | Bodner et al. | 434/353 |
| 2004/0202988 A1 * | 10/2004 | Evans et al. | 434/236 |
| 2005/0222799 A1 | 10/2005 | Bolt et al. | |
| 2006/0074655 A1 | 4/2006 | Bejar | |

OTHER PUBLICATIONS

International Search Report of PCT Application No. PCT/US08/50786, Nov. 12, 2008, 2 pages.
International Preliminary Report on Patentability dated Jul. 14, 2009 from corresponding International Application No. PCT/US2008/050786.

* cited by examiner

*Primary Examiner*—Kesha Y. Frisby
(74) *Attorney, Agent, or Firm*—Jones Day

(57) ABSTRACT

A method for evaluating at least one cognitive and/or non-cognitive ability of a user is disclosed herein The method comprises receiving performance data from at least one associated activity, transmitting said performance data to an analysis engine, receiving, from the analysis engine and based on the new and pre-existing performance, an evaluation and diagnostic feedback, wherein the evaluation and diagnostic feedback are the product of at least one mathematical model, and wherein the evaluation describes the at least one cognitive and/or non-cognitive ability, and transmitting to the user report text, wherein the report is based on both the evaluation and the diagnostic feedback.

18 Claims, 2 Drawing Sheets

COGNITIVE / NON-COGNITIVE ABILITY ANALYSIS ENGINE

REFERENCE TO RELATED APPLICATION

This application claims priority to U.S. Provisional Application No. 60/884,284, entitled "Non-Cognitive Ability Analysis," filed Jan. 10, 2007, which is incorporated by reference herein.

BACKGROUND OF INVENTION

There currently exist a number of resources to provide information about a person's cognitive abilities such as academic skills (e.g., verbal and math) and content knowledge (e.g., history and science), including but not limited to various tests, such as the SAT. In addition, there exist a number of resources to provide information about a person's non-cognitive skills, (e.g., conscientiousness, test anxiety, and time management). However, there exists a need for a means to incorporate user performance data from multiple sources, and for multiple skill areas, over time, in order to provide ongoing useful and formative evaluation and feedback to the user and other authorized parties.

SUMMARY OF THE INVENTION

Disclosed herein is a method for collecting and evaluating at least one cognitive and/or non-cognitive ability of a user comprising receiving responses to at least one designated activity said activity transmitting the responses to an analysis engine, receiving, from the analysis engine and based on the present responses (and, in a preferred embodiment, prior responses), an evaluation and diagnostic feedback, wherein the evaluation and diagnostic feedback are the product of at least one mathematical model, and wherein the evaluation describes the at least one cognitive and/or non-cognitive ability, and generating text for a report, wherein the report is based on both the evaluation and the diagnostic feedback.

BRIEF DESCRIPTION OF DRAWINGS

Aspects, features, benefits and advantages of the embodiments of the present invention will be apparent with regard to the following description, appended claims and accompanying drawings where:

DETAILED DESCRIPTION OF THE INVENTION

Figure 1:
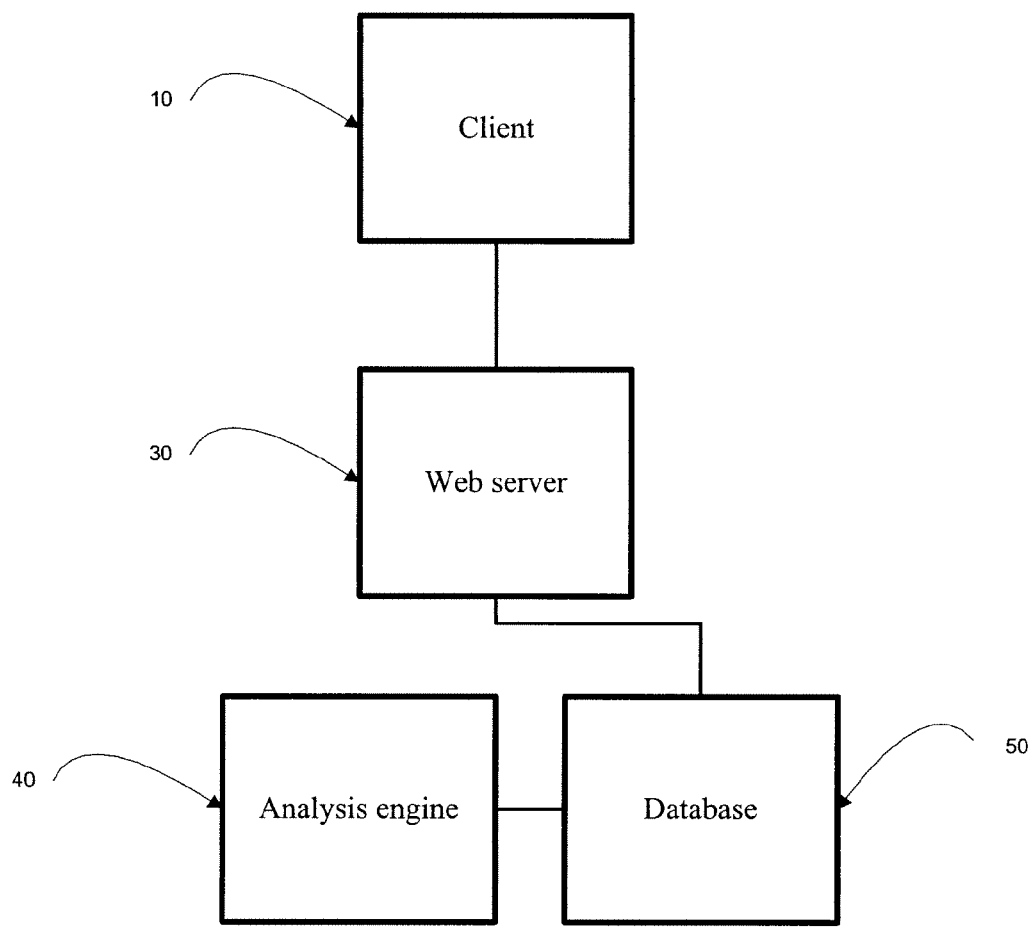
FIG. 1 is a block diagram of an exemplary embodiment of a cognitive and/or non-cognitive ability analysis system according to the present invention.

An exemplary cognitive and/or non-cognitive ability analysis system according to an embodiment of the present invention is illustrated in FIG. 1. The system comprises a client 10. The client 10 may be a personal computer, laptop, or a similar device, including a handheld device. The client 10 should provide an interface to a user via a display and a keyboard, mouse, touch-sensitive display and/or stylus.

The client 10 is connected to web server 30. In a preferred embodiment, the client 10 is connected to the web server 30 over the internet. Web server 30 is preferably connected to database 50 over a local area network, but other connection options are known to one of ordinary skill. Further, the web server 30 and database 50 may reside in the same physical machine, thus not requiring a network connection. Web server 30 serves extracts data from the database 50 and constructs web pages using the extracted data for transmission to the client 10. Although described in a preferred embodiment as a web server, the web server 30 may serve other types of content in addition to web pages, such as Flash content. In a preferred embodiment, web server 30 serves static HTML content, dynamic Java/JSP web pages, as well as Flash-based content. The hardware and software options available for a web server 30 are well known and understood to one of ordinary skill in the art.

The database 50 contains data required for the operation of the present invention. The database 50 may contain user data, task data, task results, and assessment data. Task data may include data regarding surveys and activities, such as survey questions, and data defining activities. Activities may include watching a video or playing memory games. Task results may include data such as survey responses and the time at which the survey was taken. Task results may further include data such as whether a video was watched to completion, whether a game was in quit in the middle, and time at which the activity was undertaken. Assessment data contains data about a user compiled by the analysis engine 40.

The analysis engine 40 is a back end model-driven system. The analysis engine 40 receives user data and evaluation data from the database 50. In a preferred embodiment, the user and evaluation data is received in an XML format. The analysis engine 40 may then evaluate the user and evaluation data, and then return a recommendation and report to the database 50.

Figure 2:
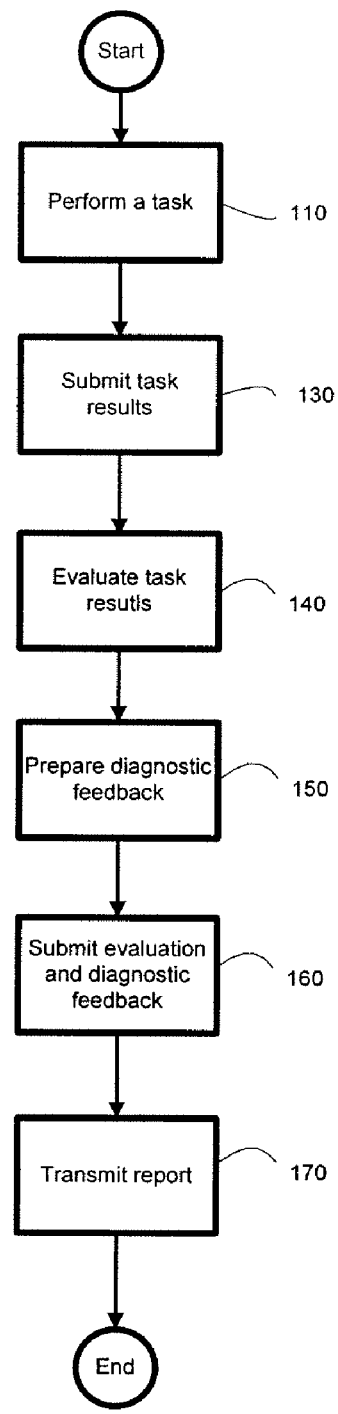
FIG. 2 is a flow chart of the operation of an exemplary embodiment of a cognitive and/or non-cognitive ability analysis system according to the present invention.

The operation of an exemplary cognitive and/or non-cognitive ability analysis system according to an embodiment of the present invention is illustrated in FIG. 2. First, a user may navigate to a web site hosted on web server 30 and perform 110 a task, such as taking a survey or performing an activity. The web server 30 preferably logs the survey responses or actions performed during an activity. The web server 30 preferably and additionally logs additional data such as the time the survey or activity was initiated, the time the survey or activity was completed, and whether the survey or activity was finished or terminated prematurely. These logged survey responses, actions, and additional data may collectively be referred to as task results.

Surveys may include, for instance, surveys inquiring into a user's test anxiety, surveys addressing a user's time management skills, surveys addressing a user's learning strategies, surveys addressing a user's avocational interests, surveys addressing a user's sleep type, and surveys addressing a user's personality. An exemplary test anxiety survey may provide a number of statements, and may request the user's level of agreement with each statement. This level of agreement may be represented on a scale of 1-5. Exemplary statements may include "I have trouble sleeping the night before a test," "I think taking tests is no big deal," "I feel worried or upset before a test," "I try not to think about the test," "I cry when the questions are too hard," "I have trouble concentrating during a test," "I hope I never have a test like that again," or "I'm exhausted and ready for a nap." One of ordinary skill in the art will understand that the exact selection of survey statements or questions is highly variable and dependent upon the targeted age group, the testing in question, and many other variables.

Activities may include, for instance, a game involving matching shapes on a timed basis. The web server 30 may log the number of correctly matched shapes in a fixed amount of time, or the time spent by the user in matching all shapes correctly.

Once a user has completed a task (such as a survey or activity), or at some other interval, the task results logged by web server 30 may be submitted 130 to the database 50. In a preferred embodiment, these results are submitted in an XML format.

The analysis engine 40 then evaluates 140 the task results. In a preferred embodiment, the analysis engine 40 uses model-based evaluation. Each survey or activity is associated in the database with one or more models. These models represent the logical and mathematical structure of specific constructs, the score scales associated with those constructs, the evaluation functions that map task results (e.g., survey response or activity result) onto those score scales, and the evaluations functions that aggregate task-level results to produce construct-level results. For instance, constructs for test anxiety may include the user's body, concentration and mood. Constructs for time management may include goal-setting and organizing time and tasks. Constructs for avocational interests may include computing, sports, housekeeping, games and mind-opening. Constructs for personality may include, for instance, extraversion, agreeableness, conscientiousness, temperament, and openness to experience. In a preferred embodiment, each survey statement corresponds to one construct. For instance, of the above-listed exemplary test anxiety survey statements, "I have trouble sleeping the night before a test," "I cry when the questions are too hard" and "I'm exhausted and ready for a nap" correspond to the user's body construct. "I try not to think about the test" and "I have trouble concentrating during a test" correspond to the user's concentration construct. "I think taking tests is no big deal," "I feel worried or upset before a test," and "I hope I never have a test like that again" all correspond to the user's mood construct.

In evaluating the task results in a preferred embodiment, the analysis engine 40 identifies construct models related to the task. In an embodiment, different construct models may require different data packaging. In such an embodiment, construct model-specific data packaging requirements are identified and the task results packaged accordingly. Then, based the identified construct models, task-level evaluation functions are used to transform the packaged data onto model-specific score scales. These task-level evaluations function vary depending on construct, and are generally empirically determined through factor analytic studies and other means. For instance, some evaluation functions can be represented as simply sums of response data, others as weighted averages, others as maximum likelihood estimations, and still others as the result of extensive Bayesian network calculations.

Construct level evaluation functions then access these model-specific score scales and associated score data, as well as previously stored model-specific score scales and score data extracted from the database 50, and transform the new and previously stored model-specific score data onto construct-level score scales.

Further, the analysis engine 40 may evaluate task results from multiple, disparate tasks together. Each model may contain one or more aggregate evaluation functions that operate on multiple sources of scaled or raw task results to produce construct-level report text.

Based upon the evaluation, the analysis engine 40 may prepare 150 diagnostic feedback for the user. The analysis engine may perform this step by assigning partition categories based on the new construct-level score scales, as well as previously existing construct-level score scales extracted from the database 50. Then, diagnostic feedback may be extracted from the database for the assigned partition categories For instance, if the user's concentration construct indicates that the user has difficulties concentrating, the analysis engine 40 may prepare feedback suggesting that the user perform specific exercises to assist in concentration. This diagnostic feedback may utilize additional data, such as the user's grade level, to prepare diagnostic feedback.

The analysis engine 40 may then submit 160 the evaluation and diagnostic feedback to the database 50, where the evaluation and diagnostic feedback may be stored. The evaluation may include model-specific score data and construct-level score scales.

The web server 30 may then transmit 170 a report to the client 10 utilizing the evaluation and diagnostic feedback stored in the database 50. The report may identify the surveys completed and activities performed by a user, as well as the user's scores in each. The report may include diagnostic feedback as outlined above. The report may further attempt to describe the user using the evaluation. For instance, the report may indicate that the user is a morning person. Further, the report may be customized based on whether the user is a student or a parent.

In an alternate embodiment, users may be evaluated, and diagnostic feedback may be provided, based upon the scholastic stage of the user. For instance, a middle school user's responses to a time management survey may be evaluated differently from a high school user's time management survey, which may be evaluated differently from a college user's time management survey. In a preferred embodiment, for each construct, there exists separate models for middle school, high school, college, and post-collegiate users. These models may differ in that, for instance, expectations as to cognitive and/or non-cognitive abilities change. That is, a college student may be expected to exhibit higher concentration levels than a middle school student.

While illustrative embodiments of the invention have been shown herein, it will be apparent to those skilled in the art that the invention may be embodied still otherwise without departing from the spirit and scope of the claimed invention.

The invention claimed is:

1. A computer implemented method for analyzing user performance data from multiple sources, and for providing evaluation and feedback regarding user performance, the method comprising:

receiving performance data for evaluating the user with a computer, the performance data resulting from the user performing a first task for evaluating a cognitive ability of the user and a second, different task for evaluating a non-cognitive ability of the user;

analyzing the performance data with the computer using mathematical models related to the first and second tasks;

wherein the analyzing performance data comprises:

identifying construct models as the mathematical models related to the first and second tasks;

identifying model-specific evaluation functions for each of the construct models;

transforming the performance data onto score scales using the model-specific evaluation functions, resulting in model-specific scaled score data;

transforming the model-specific scored scaled data and previously stored model-specific scaled score data into construct-level scores;

identifying score scale partition categories based on the construct-level scores;

retrieving category-specific diagnostic feedback based on the identified score scale partition categories;

generating an evaluation and diagnostic feedback with the computer based upon the analyzing;

generating a report regarding user performance using the diagnostic feedback and the evaluation; and transmitting the report.

2. The method of claim 1 wherein each construct model corresponds to a construct representing at least one cognitive or non-cognitive ability.

3. The method of claim 2 wherein user-generated performance data corresponding to a construct is assigned one or more values and the one or more values are combined in a mathematical fashion.

4. The method of claim 3, wherein the one or more values are mathematically mapped to one or more score scales corresponding to skill levels in one or more constructs.

5. The method of claim 2, wherein the construct represents the user's ability to concentrate, goal-setting ability, organization ability, knowledge of computers, sports ability, housekeeping ability, games ability, extraversion, agreeableness, conscientiousness, temperament, or openness to experience.

6. The method of claim 1, wherein the first task measures mathematical ability or content knowledge of the user.

7. The method of claim 6, wherein the second task measures conscientiousness or test anxiety of the user.

8. The method of claim 1, wherein separate mathematical models exist for users of different scholastic stages.

9. The method of claim 1, wherein the user performs the first and second tasks by connecting to a web server that serves static HTML content, dynamic Java/JSP web pages, and Flash-based content.

10. A system for analyzing user performance data from multiple sources and for providing evaluation and feedback regarding user performance, comprising:

a computer; and a database, wherein the computer is programmed for executing steps comprising:

receiving performance data for evaluating the user with a computer, the performance data resulting from the user performing a first task for evaluating a cognitive ability of the user and a second, different task for evaluating a non-cognitive ability of the user;

analyzing the performance data with the computer using mathematical models related to the first and second tasks;

wherein the analyzing performance data comprises:

identifying construct models as the mathematical models related to the first and second tasks;

identifying model-specific evaluation functions for each of the construct models;

transforming the performance data onto score scales using the model-specific evaluation functions, resulting in model-specific scaled score data;

transforming the model-specific scored scaled data and previously stored model-specific scaled score data into construct-level scores;

identifying score scale partition categories based on the construct-level scores;

retrieving category-specific diagnostic feedback based on the identified score scale partition categories;

generating an evaluation and diagnostic feedback with the computer based upon the analyzing;

generating a report regarding user performance using the diagnostic feedback and the evaluation; and transmitting the report.

11. The system of claim 10 wherein each construct model corresponds to a construct representing at least one cognitive or non-cognitive ability.

12. The system of claim 11 wherein user-generated performance data corresponding to a construct is assigned one or more values and the one or more values are combined in a mathematical fashion.

13. The system of claim 12, wherein the one or more values are mathematically mapped to one or more score scales corresponding to skill levels in one or more constructs.

14. The system of claim 11, wherein the construct represents the user's ability to concentrate, goal-setting ability, organization ability, knowledge of computers, sports ability, housekeeping ability, games ability, extraversion, agreeableness, conscientiousness, temperament, or openness to experience.

15. The system of claim 10, wherein the first task measures mathematical ability or content knowledge of the user.

16. The system of claim 15, wherein the second task measures conscientiousness or test anxiety of the user.

17. The system of claim 10, wherein separate mathematical models exist for users of different scholastic stages.

18. The system of claim 10, wherein the user performs the first and second tasks by connecting to a web server that serves static HTML content, dynamic Java/JSP web pages, and Flash-based content.

* * * * *